Nov. 18, 1969    Z. FOX    3,478,761
FLUID CONTROL DEVICE
Filed Nov. 16, 1966
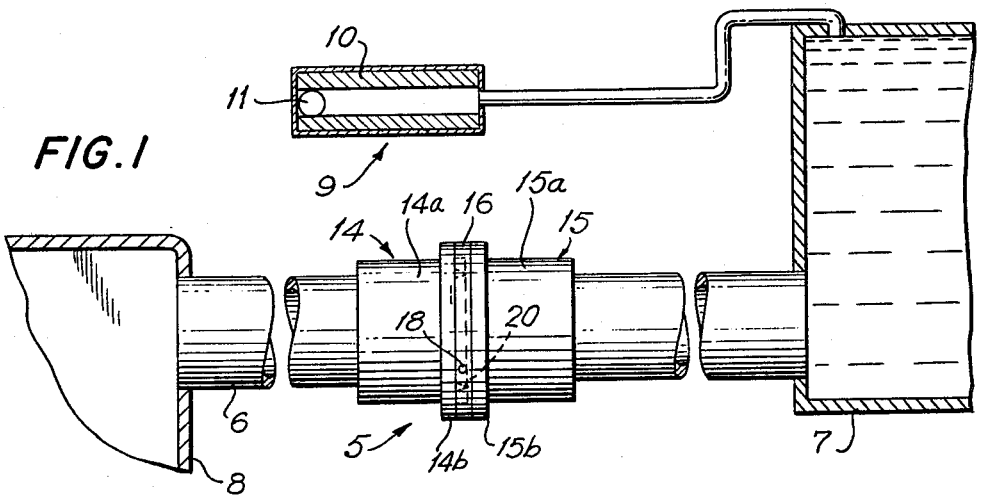
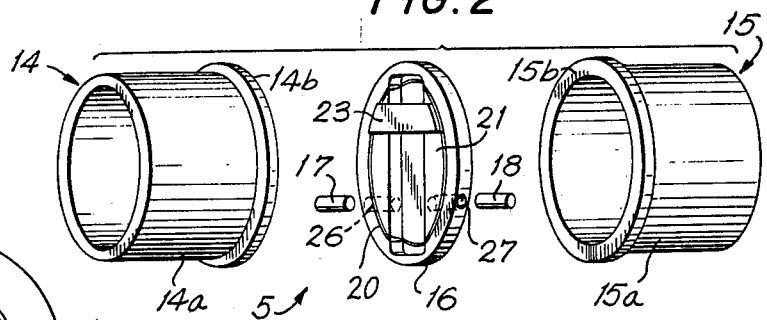
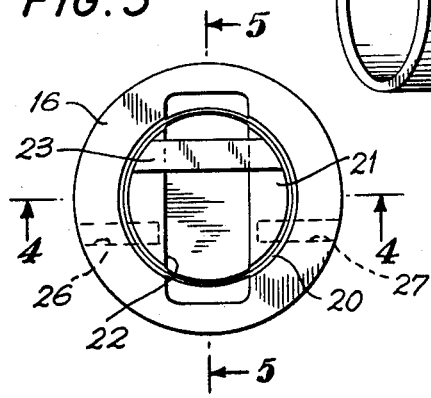
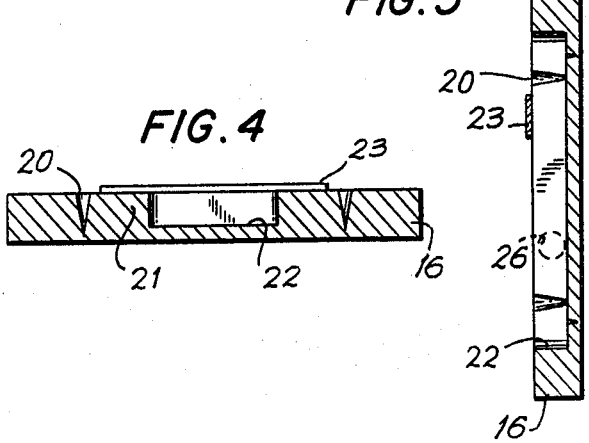
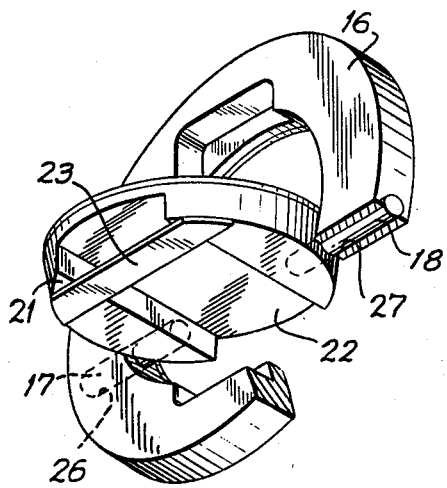
INVENTOR.
ZOLA FOX
BY
Curtis, Morris & Safford
ATTORNEYS

United States Patent Office 3,478,761
Patented Nov. 18, 1969

3,478,761
FLUID CONTROL DEVICE
Zola Fox, Verona, N.J., assignor to Thiokol Chemical Corporation, Bristol, Pa., a corporation of Delaware
Filed Nov. 16, 1966, Ser. No. 594,913
Int. Cl. F16k 17/40
U.S. Cl. 137—68                    5 Claims

ABSTRACT OF THE DISCLOSURE

A fluid flow control device is presented which normally seals an enclosure such as a pipeline and breaks upon the application of a predetermined pressure about a preformed annular notch. The broken out portion is then held in place but in a position to present a minimum resistance to fluid flow.

---

The present invention relates to an improved flow control device for normally sealing an enclosure but permitting flow therefrom at a predetermined pressure.

Heretofore, rupture disks have been used for sealing a closure, such as a pressure vessel containing a fluid, and which breaks open when a predetermined pressure is applied. Such a disk when ruptured is carried away with the fluid and may become so lodged in a pipeline, or the like, as to interfere with the free flow of fluid from the closure. Also, the use of butterfly valves for controlling the flow of fluids in pipelines is well known.

One of the objects of the present invention is to provide a control device in the form of an integral plate from which a section ruptures at a predetermined pressure to permit flow and which is held in a position to present a minimum resistance to flow.

Another object is to provide a flow control device of the type indicated in which a rupture disk is adapted to break away from a plate in one piece and then pivot in the opening in the manner of a butterfly valve.

Still another object is to provide an improved flow control device of the type indicated which is of simple and compact construction, economical to manufacture and one which is reliable in operation.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims:

In the drawing:

FIGURE 1 is a diagrammatic view, partly in section, showing the flow control device of the present invention applied in a pipeline between two vessels;

FIGURE 2 is an exploded view of the flow control device and showing the five parts thereof in relation to each other;

FIGURE 3 is a plan view of the rupture plate showing the circular notch forming a weakened disk section and the pivot pins extending through the rupture plate and notch into the disk section;

FIGURE 4 is a sectional view taken on line 4—4 of FIGURE 3 to show the notch in the closure plate for determining the cross-sectional area and predetermined force at which the disk will break away from the plate;

FIGURE 5 is a sectional view taken on line 5—5 of FIGURE 3 to show the slot in the face of the rupture plate and cross-bar forming a hydrofoil; and FIGURE 6 is a perspective view of the device showing the disk broken away from the rupture plate and rocked on the pivot pins to a right angular position relative to the plate.

FIGURE 1 of the drawing shows the flow control device 5 of the present invention applied in a pipeline 6 through which a fluid, such as a liquid fuel, flows from a vessel 7 to a vessel 8. The flow control device 5 of the present invention may have different applications, such as in a pipeline connecting a liquid fuel tank to the combustion chamber of a rocket engine. Flow control device 5 normally seals the vessel 7 until a predetermined pressure is applied which causes the fluid to break through the device and flow through the pipeline 6 to the vessel 8. Means such as a gas generator 9, for pressurizing the vessel 7 to a pressure above the pressure at which the liquid breaks through is shown in FIGURE 1 as comprising a solid fuel grain 10 and igniter 11.

The flow control device 5 comprises only five parts including the pipe coupling 14 and 15, a rupture plate 16 and pivot pins 17 and 18. Each of the pipe couplings 14 and 15, in turn, comprises a nipple 14a or 15a adapted for attachment to the ends of the pipe section forming the pipe 6 and a flange 14b or 15b extending radially from the nipple.

The rupture plate 16 is clamped or welded between the flanges 14b and 15b of the pipe couplings 14 and 15 to provide a fluid tight joint. Plate 16 comprises a single piece of any suitable material, such as steel, aluminum, plastic, or the like, which is cut with a continuous notch 20 to enclose a section 21 therein adapted to break away from the remainder of the plate when a predetermined pressure is applied at the side thereof opposite the notch. To this end, the notch 20 is cut to a depth which leaves a predetermined cross section of material between the bottom of the notch and opposite side of the plate along the notch and a resistance to a shear force equal to the predetermined pressure at which the section 21 will rupture and break away from the remainder of the plate along the line of said notch. In the illustrated embodiment, the notch 20 is cut in a circular path in plate 16 to provide a rupture section 21 therein in the form of a disk, but the notch may be cut to form a rupture section of other shapes such as rectangular, triangular or even an oval shape.

The side of the rupture disk 21 having the notch 20 is formed to provide a hydrofoil. This structure comprises a recess cut therein to form a generally rectangular slot 22 extending across the entire face of the disk. Overlying the front of the disk 21 at one side of its center is a bar 23 forming the hydrofoil. Thus, when a fluid such as liquid fuel flows through the slot 22 across the face of the rupture disk 21, the bar 23 is acted on by the flowing liquid to maintain the disk parallel to the direction of flow of the stream.

The closure plate 16 has holes 26 and 27 drilled from its edges in a direction generally parallel to the flat sides thereof and extending through the notch 20 into the sides of the rupture disk 21 in axial alignment. Pins 17 and 18 are then inserted in the drilled holes 26 and 27 to form a pivot for the rupture disk 21 when it breaks away from the remainder of the plate. To permit the ruptured disk 21 to swing on its pivot pins 17 and 18, the nipples 14a and 15a must have a diameter at least equal to the diameter of the disk and a length greater than the length of the disk from its pivot to its most remote edge. One form of the invention having now been described in detail, the mode of operation is next explained.

The flow control device 5 comprising the plate 16 connected between the pipe couplings 14 and 15 is connected in the pipeline 6 between the vessels 7 and 8 with the unscored side of the plate facing up stream. Liquid in the vessel 7 then may flow through the section of the pipeline 6 connected to the inlet pipe coupling 14 where it engages the unscored side of the integrally formed closure plate 16 to provide an hermetic seal and prevent any leakage of liquid through the pipeline 6. When the pressure in the vessel 7 exceeds a predetermined value, either when the device acts as a safety release for a pressure vessel, or is purposely pressurized by some means, such as the gas generator 9, the rupture disk 21 breaks away from the remainder of the plate 16 along the line of the groove 20. As stated above, the pressure at which the rupture disk does break away from the remainder of the plate 16 is determined by the depth to which the notch 20 is cut in the plate, the remaining cross sectional area of the particular material, its resistance to shear and the eccentricity of the pivot pins 17 and 18.

When the rupture disk 21 does break away from the remainder of the plate 16, the pressure of the fluid acting on the face of the ruptured disk tends to rock it about the pivot pins 17 and 18 arranged eccentrically of the center of disk 21 from the position shown in FIGURE 2 to that shown in FIGURE 6. The pivoted disk lies edgewise in the stream of fluid flowing through the device where it presents a minimum resistance to flow, and the slot 22 and cross bar 23 act as a hydrofoil to hold the disk parallel to the direction of flow. Thus, the flow control device 5 operates to seal a container, such as a vessel 7, and prevents the flow of a fluid therefrom until a predetermined pressure is exceeded at which time the center section 21 breaks away from the remainder of the plate 16 to open the pipeline 6 for flow of fluid therethrough. However, the ruptured disk 21 is held in position in the device 5 to prevent it from moving with the stream of fluid and lodging at some place where it might impede flow.

It will now be observed that the present invention provides a flow control device for preventing the flow of a fluid from a closure or pipeline, but which ruptures when a predetermined pressure is exceeded without danger of release of the ruptured part into the stream of released fluid. It will also be observed that the present invention provides a flow control device in which the ruptured disk breaks away from an integral closure plate and pivots in the opening in the manner of a butterfly valve. It will still further be observed that the present invention provides an improved closure device which is of simple and compact construction, adapted for economic manufacture and one which is reliable in operation.

I claim:
1. Apparatus for controlling flow of a fluid comprising a closure plate located in a pipeline through which a liquid may flow from one vessel to another, said closure plate extending across said pipeline and being notched to form a body section and a circular weakened section which will break away from the plate upon the application of a predetermined pressure on one side thereof, at least one pin in the plate, the axis of said pin extending through the notch and into the weakened and body sections thereof and located at one side of the center of the weakened section, and means for applying a pressure to break the weakened section free from the closure plate whereby the ruptured section pivots on the pin in the plate to permit the flow of liquid while retaining it adjacent the plate.

2. Apparatus in accordance with claim 1 in which a pair of axially aligned pins are provided in the plate the axes of which extend across the notch into the weakened and body sections of the plate at opposite sides thereof.

3. Apparatus in accordance with claim 1 in which the weakened section has spaced surfaces parallel to the surface of the plate to form a hydrofoil for holding the valve section parallel to the direction of flow of the liquid.

4. Apparatus in accordance with claim 3 in which the hydrofoil is formed by a rectangular slot in the surface of the weakened section, and a narrow transverse bar extending across the surface of the section.

5. Apparatus in accordance with claim 1 in which the closure plate is connected between pipe couplings to seal the joints therebetween, the pipe couplings being connected to sections of the pipeline, and the axes of the pivot pins extending from the plate through the notch and into the weakened section in a plane parallel to the surface of the plate.

References Cited
UNITED STATES PATENTS

| 3,074,421 | 1/1963 | Borcherdt | 137—68 |
| 3,134,390 | 5/1964 | Porter | 137—68 |

FOREIGN PATENTS

| 545,879 | 3/1932 | Germany. | |

WILLIAM F. O'DEA, Primary Examiner

R. GERARD, Assistant Examiner

U.S. Cl. X.R.
137—527.8; 220—89